(12) United States Patent
Queveau et al.

(10) Patent No.: US 7,316,438 B2
(45) Date of Patent: Jan. 8, 2008

(54) RETRACTABLE PACKAGE SHELF SYSTEM FOR CONVERTIBLE VEHICLE WITH FOLDING ROOF

(75) Inventors: Gerard Queveau, Cerizay (FR); Paul Queveau, Cerizay (FR); Jean-Marc Guillez, Cerizay (FR)

(73) Assignee: Societe Europeenne des Brevets Automobiles (FR)

( * ) Notice: Subject to any disclaimer, the term of this patent is extended or adjusted under 35 U.S.C. 154(b) by 218 days.

(21) Appl. No.: 10/513,006

(22) PCT Filed: Apr. 30, 2003

(86) PCT No.: PCT/FR03/01365

§ 371 (c)(1),
(2), (4) Date: Jun. 10, 2005

(87) PCT Pub. No.: WO03/093043

PCT Pub. Date: Nov. 13, 2003

(65) Prior Publication Data

US 2005/0236855 A1  Oct. 27, 2005

(30) Foreign Application Priority Data

May 3, 2002 (FR) .................................. 02 05568

(51) Int. Cl.
*B60N 3/00* (2006.01)
(52) U.S. Cl. ................................................. 296/24.43
(58) Field of Classification Search ............ 296/24.43, 296/107.08
See application file for complete search history.

(56) References Cited

U.S. PATENT DOCUMENTS

| 5,967,593 | A  | * | 10/1999 | Schuler et al. | 296/136.06 |
|---|---|---|---|---|---|
| 6,145,915 | A  | * | 11/2000 | Queveau et al. | 296/107.08 |
| 6,572,145 | B1 | * | 6/2003 | Guillez et al. | 280/756 |
| 6,619,721 | B1 | * | 9/2003 | Langguth et al. | 296/136.06 |
| 6,722,723 | B2 | * | 4/2004 | Obendiek | 296/107.08 |
| 6,796,594 | B2 | * | 9/2004 | Antreich | 296/107.08 |
| 6,840,563 | B2 | * | 1/2005 | Fuchs et al. | 296/107.08 |
| 6,840,564 | B2 | * | 1/2005 | Heller et al. | 296/107.08 |
| 6,863,333 | B2 | * | 3/2005 | Heller et al. | 296/107.09 |
| 6,921,122 | B2 | * | 7/2005 | Obendiek et al. | 296/107.07 |
| 7,093,885 | B2 | * | 8/2006 | Guillez et al. | 296/107.08 |
| 7,178,852 | B2 | * | 2/2007 | Obendiek et al. | 296/107.17 |
| 2002/0041109 | A1 |   | 4/2002 | Wagner et al. | |

* cited by examiner

*Primary Examiner*—H Gutman
(74) *Attorney, Agent, or Firm*—Bachman & LaPointe

(57) ABSTRACT

Close to its front inner corner, each side plate is provided with an extension extending transversely inwards under the central plate and carrying a pivot member adapted to co-operate with a coaxial complementary pivot member fixed under the central plate, and in that each side plate is mounted to pivot about an axis that is common to the two pivot members, which axis is substantially perpendicular to the top surface of the central plate and arranged such that, in the pivoted position, each side plate is stowed substantially under the central plate. The system further advantageously comprising a device for causing each side plate to pivot relative to the central plate while the central plate is pivoting.

17 Claims, 3 Drawing Sheets

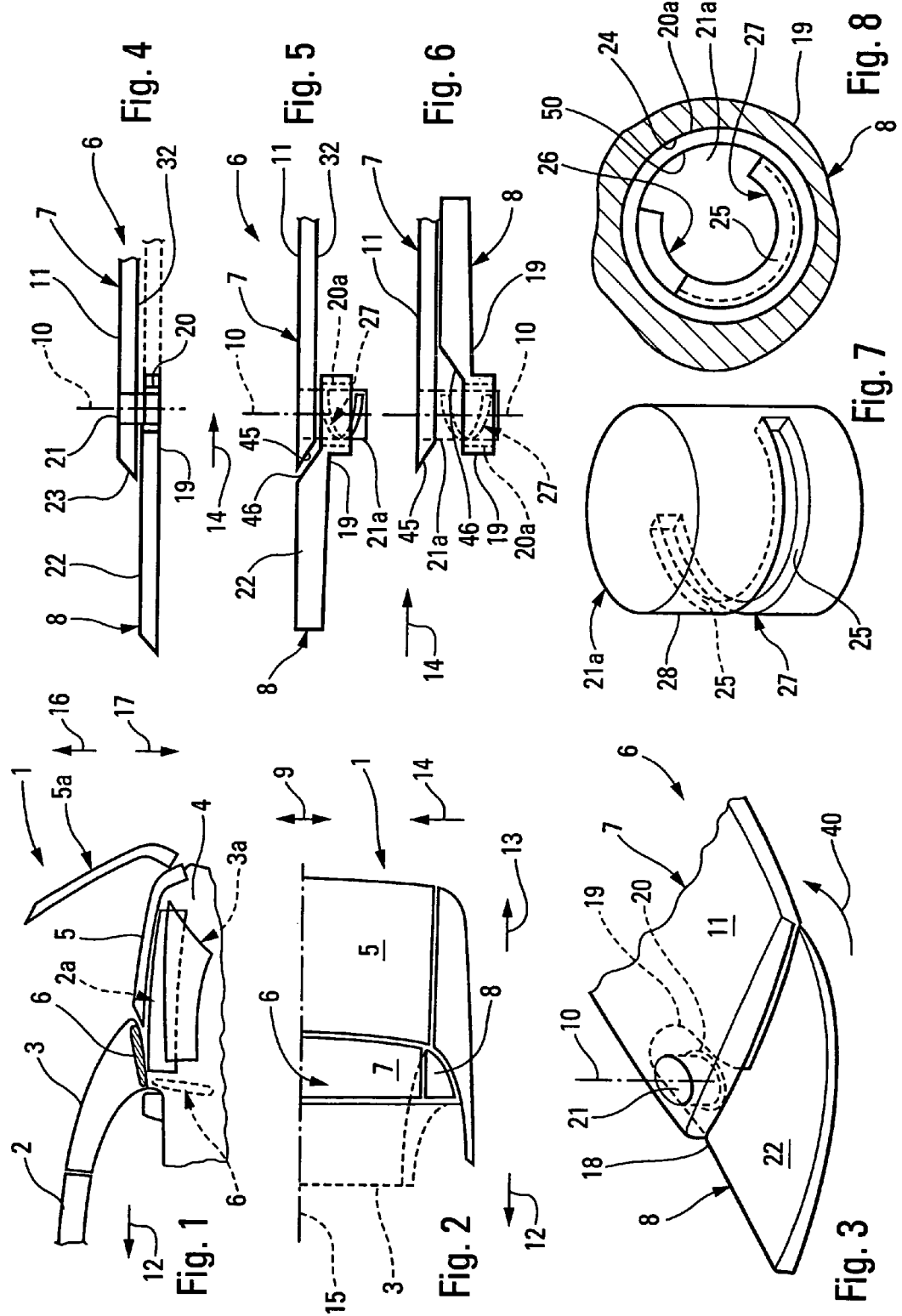

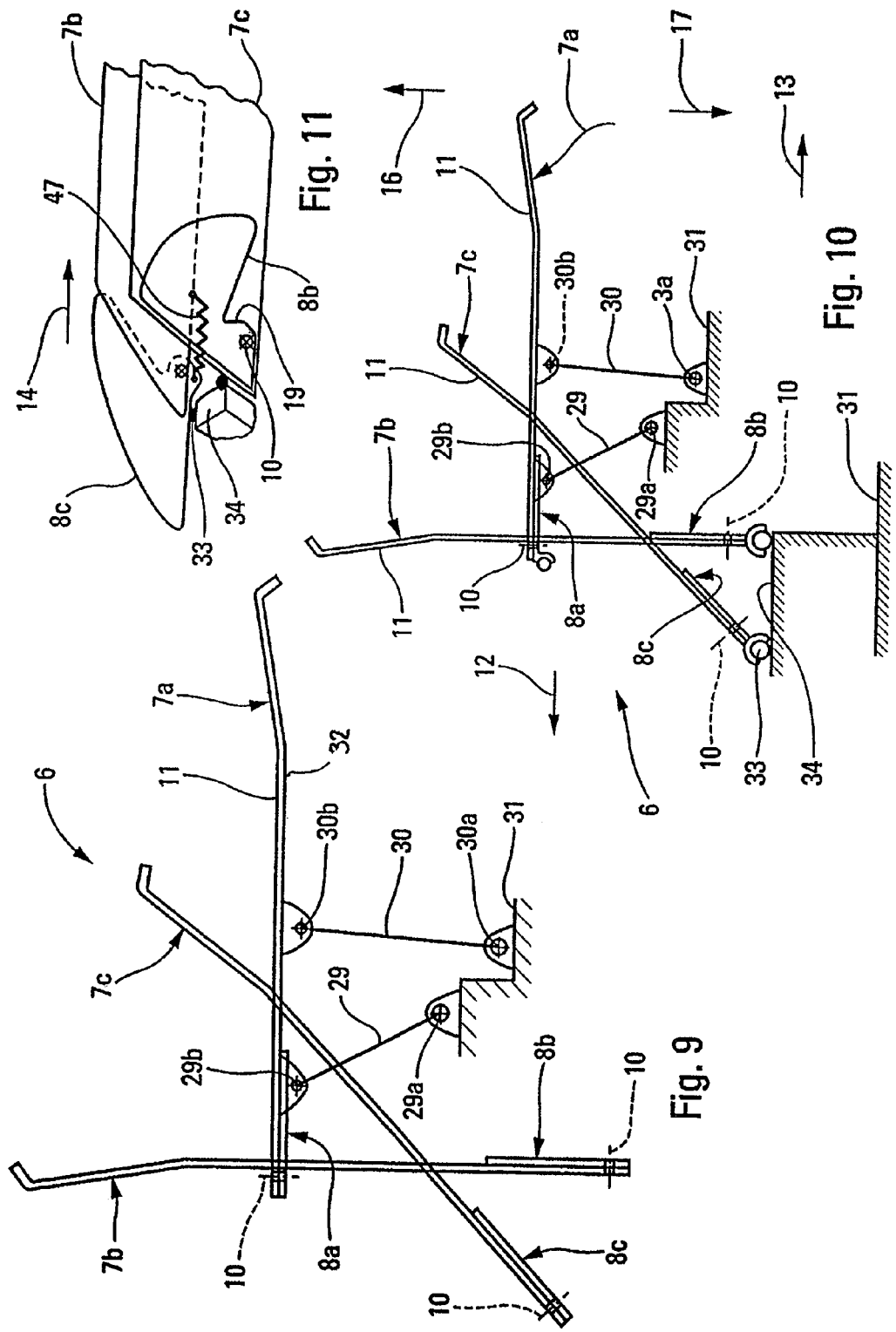

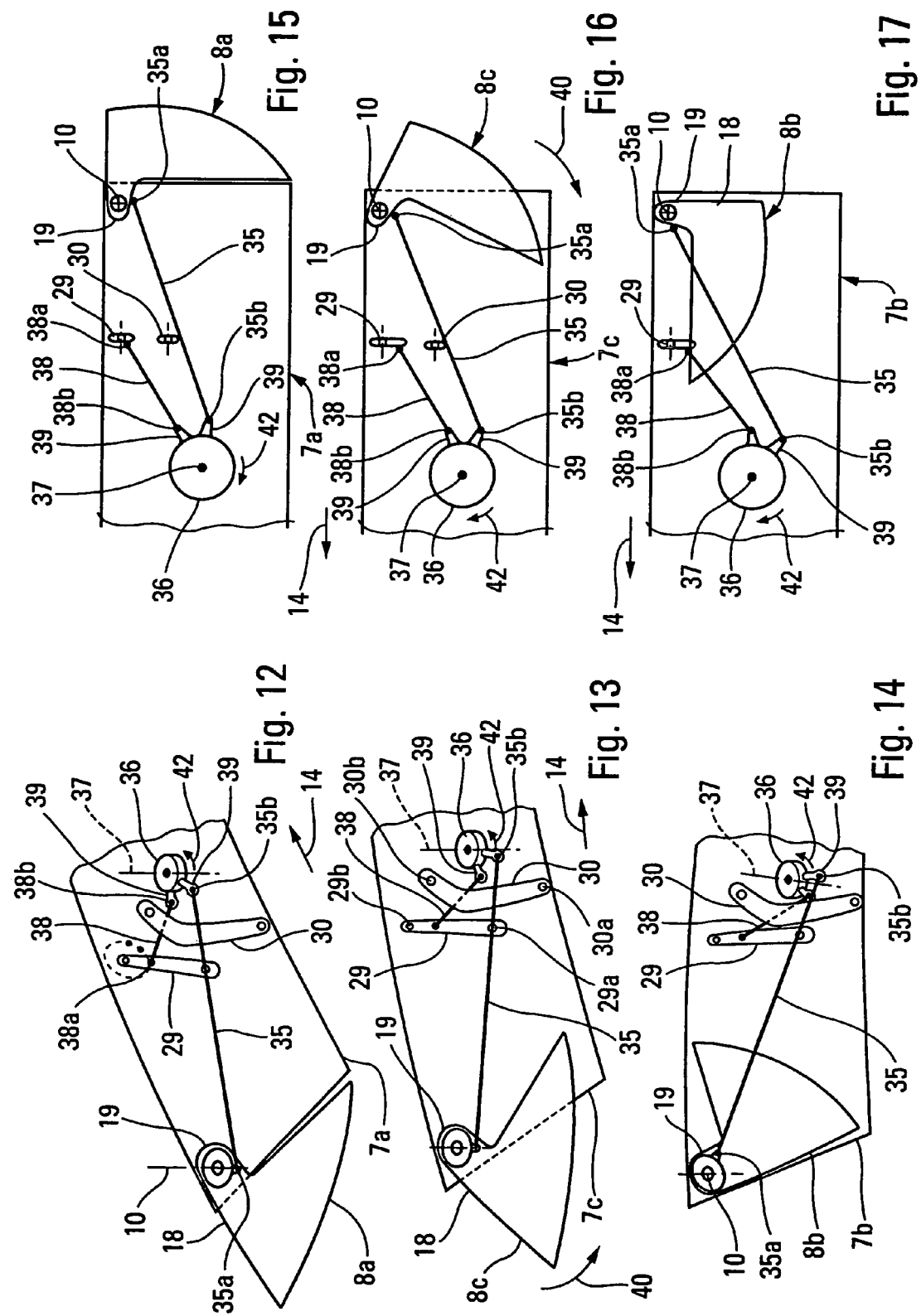

RETRACTABLE PACKAGE SHELF SYSTEM FOR CONVERTIBLE VEHICLE WITH FOLDING ROOF

BACKGROUND OF THE INVENTION (1) Field of the Invention

The present invention relates to a retractable back shelf system for a convertible vehicle having a foldable roof.

(2) Prior Art

Such a retractable back shelf system is known per se, and it comprises at least one plate and means for causing said plate to pivot about an axis that extends transversely relative to the vehicle between its normal position and a stowed position in which it is stowed inside the rear trunk and in which it enables the foldable roof to be folded into the rear trunk.

When the back shelf system comprises a single plate extending over the entire transverse dimension of the cabin of a vehicle, the size of that plate can give rise to difficulties if the plate in its retracted position in which it is retracted into the rear trunk is to be placed in the space of limited transverse dimension situated between the wheels.

For that reason, a back shelf system is known that comprises a central plate and two side plates that are disposed on either side of the central plate and that are movable relative thereto, that system further comprising means for moving the side plates relative to the central plate while the central plate is being caused to pivot in one direction or the other.

Known retractable back shelf systems with moving side plates are, in general, voluminous, unattractive in appearance, and unreliable.

SUMMARY OF THE INVENTION

An object of the present invention is to provide a retractable back shelf system of the above-mentioned type that is of simple structure, that, when the back shelf is in the normal position, has an appearance pleasing to the eye, and that, when the back shelf is in each of its positions and while said back shelf is being moved from one position to the other, occupies a only a limited space which does not require the user of the vehicle to empty the back of the vehicle completely.

According to the present invention, the retractable back shelf system of the above-mentioned type is characterized in that, close to its front inner corner, each side plate is provided with an extension extending transversely inwards under the central plate and carrying a pivot member adapted to co-operate with a coaxial complementary pivot member fixed under the central plate, and in that each side plate is mounted to pivot about an axis that is common to the two pivot members, which axis is substantially perpendicular to the top surface of the central plate and arranged such that, in the pivoted position, each side plate is stowed substantially under the central plate, the system further advantageously comprising means for causing each side plate to pivot relative to the central plate while said central plate is pivoting.

By pivoting about an axis substantially perpendicular to the top surface of the central plate in order to be stowed substantially thereunder, each side plate is movable into a space that is situated under the central plate and that is usually unoccupied or difficult to use.

The corresponding side plate can thus be retracted almost completely under the central plate.

Other features and advantages of the present invention appear from the following description.

BRIEF DESCRIPTION OF THE DRAWINGS

In the accompanying drawings, given merely as non-limiting examples:

FIG. 1 is a fragmentary diagrammatic elevation view of a convertible vehicle having a foldable roof and including a back shelf system of the present invention;

FIG. 2 is a fragmentary diagrammatic plan view of the vehicle of FIG. 1;

FIG. 3 is a fragmentary diagrammatic perspective view of an embodiment of a retractable back shelf system of the present invention;

FIG. 4 is a fragmentary section view substantially on IV-IV of FIG. 3;

FIG. 5 is a view similar to FIG. 4, showing another embodiment of the present invention, the side plate being in its normal position;

FIG. 6 is a view similar to FIG. 5, the side plate being in its pivoted and retracted position in which it is pivoted and retracted under the central plate;

FIG. 7 is a fragmentary diagrammatic perspective view of the complementary pivot member shown in FIGS. 5 and 6;

FIG. 8 is a diagrammatic cross-section view of the complementary pivot member of FIG. 7;

FIG. 9 is a diagrammatic elevation view showing three successive positions of a back shelf in an embodiment of the present invention;

FIG. 10 is a view similar to FIG. 9, showing another embodiment of the present invention;

FIG. 11 is a diagrammatic perspective view of the embodiment shown in FIG. 10;

FIGS. 12, 13, and 14 are fragmentary diagrammatic perspective views showing the left portion of another embodiment of the present invention in the three positions shown diagrammatically in FIG. 9; and FIGS. 15, 16, and 17 are fragmentary diagrammatic plan views respectively showing the right portion of the back shelf shown diagrammatically in FIGS. 12 and 14 in each of the positions shown therein.

DETAILED DESCRIPTION OF THE PREFERRED EMBODIMENTS

In the embodiment shown diagrammatically in FIGS. 1 and 2, a convertible vehicle 1 is shown that has a foldable roof made up of a front roof portion 2 and of a rear roof portion 3, which portions are mounted to move relative to the vehicle and relative to each other so as to be folded into the rear trunk 4 respectively in the positions 2a and 3a, it being possible for the lid 5 of the rear trunk to open from the front backwards into the position 5a in order to allow the two roof portions to pass through.

The vehicle 1 includes a back shelf system 6 which is shown in FIG. 1 in continuous lines in its normal position (substantially horizontal) and in dashed lines in its retracted position (in this example, a substantially vertical position in the front of the rear trunk).

As shown diagrammatically in FIG. 2, the back shelf system comprises a central plate 7 and two side plates 8 disposed on either side of the central plate 7, in the transverse direction 9 of the vehicle, and movable relative to said central plate 7.

The back shelf system 6 is provided with means for pivoting the central plate 7 in both directions about a transverse axis, i.e. an axis parallel to the transverse direction 9, between its normal position (substantially horizontal) shown in FIGS. 1 and 2, and a retracted position in which it is stowed inside the rear trunk 4, and in which it enables the two portions 2, 3 of the foldable roof to be folded into the rear trunk 4.

The back shelf system 6 is further provided with means for moving the side plates 8 relative to the central plate 7.

In the present invention, and as shown diagrammatically, for example, in FIG. 3, each side plate 8 is mounted to pivot about an axis 10 that is substantially perpendicular to the top surface 11 of the central plate 7. The axis 10 is arranged such that each side plate 8, in the pivoted position, is stowed substantially under the central plate 7. The system 6 further advantageously comprises control means for causing each side plate 8 to pivot relative to the central plate 7 (arrow 40) while said central plate 7 is pivoting from its normal position to its retraced position, and vice versa.

In the description below, the following directions are used that are defined with reference to the vehicle shown diagrammatically in FIGS. 1 and 2, namely the forwards direction, shown by arrow 12, the backwards direction shown diagrammatically by arrow 13, the inwards direction towards the inside of the vehicle, shown diagrammatically by arrow 14 and extending towards the plane of longitudinal symmetry 15 shown diagrammatically in FIG. 2, the upwards direction shown diagrammatically by arrow 16, and the downwards direction shown diagrammatically by arrow 17.

As shown diagrammatically in FIGS. 3 and 4, close to its inner front corner 18, each side plate 8 is provided with an extension 19 extending transversely inwards, in the direction indicated by arrow 14, under the central plate 7. The extension 19 carries a pivot member 20 adapted to co-operate with a coaxial complementary pivot member 21 fixed under the central plate 7.

Either the pivot member 20 or the complementary pivot member 21 is a male member, the other one being an annular female member adapted to surround the male member. The description below is given on the assumption that the complementary pivot member 21 is a cylindrical male member engaged with the annular pivot member 20 carried by the extension 19 of the side plate 8.

In the embodiment shown in FIG. 4, each side plate 8 extends in its entirety under the level of the central plate 7 so that the top surface 22 of each side plate 8 remains in a plane that is stationary relative to the pivot axis 10 of said side plate 8. The side longitudinal edge 23 of each side of the central plate 7 is advantageously beveled, with the bevel extending outwards and downwards.

In the embodiment shown in FIGS. 5 and 6, the pivot member 20a, which is fixed to the side plate 8 in a corresponding opening 24 provided in the corresponding extension 19, and the complementary pivot member 21a, which is fixed under the central plate 7, are arranged so as to constitute coaxial helical guide means adapted to move the side plate 8 axially downwards while said side plate is pivoting.

In this example, the complementary pivot member 21a fixed under the central plate 7 and the pivot member 20a fixed to the side plate 8 are provided respectively one with at least one helical cam surface 25, and the other with means forming a cam follower wheel 26 adapted to bear against the helical cam surface 25.

The cam surface 25 can belong to a groove or to a rib, the cam follower 26 having a corresponding complementary structure.

In the example shown, the helical cam surface 25 belongs to a groove 27 provided in the peripheral surface 28 of the complementary member 21a, and the cam follower 26 is a finger projecting radially inwards from the inside cylindrical surface 50 of the member 20a and engaged in the groove 27. The groove 27 has two opposite helical surfaces acting on the follower 26, one in one pivoting direction of the side plate 8, the other in the opposite pivoting direction.

The groove 27 is advantageously provided such that, in its normal position, the corresponding side plate 8 has its top surface 22 substantially in alignment with the top surface 11 of the central plate 7.

The respective side longitudinal edges 45 and 46 of the central plate 7 and of the side plate 8 are advantageously beveled, with the bevel preferably extending inwards and downwards, conversely to the edge 23 shown in FIG. 4.

Any other combination of means performing the same function to achieve the same result can also be used.

The above applies regardless of the way in which the central plate 7 pivots on the vehicle 1.

In the embodiment shown diagrammatically in FIG. 9, the central plate 7 is carried, on either side of the vehicle 1, by two pivot arms 29, 30. Each pivot arm 29, 30 is hinged, at a first end 29a, 30a, to the body 31 of the vehicle, and, at its other end 29b, 30b, to the bottom surface 32 of the central plate 7.

The arms 29, 30 are arranged so that the central plate 7 pivots downwards (arrow 17) and forwards (arrow 12) so as to go from its normal position 7a to its pivoted position 7b (substantially vertical) via an intermediate position 7c.

In the embodiment diagrammatically shown in FIGS. 10 and 11, each side plate 8 caries a wheel 33 adapted to bear against a guide surface 34 carried by the bodywork 31 of the vehicle 1, and to slide or roll along said guide surface 34 while the central plate 7 is pivoting in order to cause the side plate 8 to pivot relative to the central plate 7.

In the example shown, the wheel 33 comes into contact with the guide surface 34 in the position 7c of the central plate 7, and slides or rolls along the guide surface 34, substantially backwards, when the central plate 7 goes from its intermediate position 7c to its pivoted position 7b.

A spring of any known type, shown diagrammatically at 47, is provided so as to urge each side plate 8 continuously towards its normal position 8a in which it extends outwards in the transverse direction 9 relative to the central plate 7 (see FIG. 11).

In the embodiment shown in FIGS. 12 to 17, each side plate 8 is connected in hinged manner to a first end 35a of a first rod 35 whose other end 35b is connected in hinged manner to a control member 36 that is secured to the central plate 7, and the system 6 further comprises means adapted for moving the control member 36 while the central plate 7 is pivoting so as to cause the side plate 8 to pivot relative to the central plate 7.

In the example shown, the control member 36 is mounted under the central plate 7 so as to pivot about an axis 37 substantially perpendicular to the central plate 7, and is connected in hinged manner to one end 38b of a second rod 38 whose other end is hinged to one of the arms 29, 30 (the arm 29 in the example shown).

In this example, the control member 36 has, at its periphery, two lugs 39 projecting radially outwards and to which respective ones of the ends 35b, 38b of the two rods 35 and 38 are hinged.

Thus, when the central plate 7 pivots forwards and downwards, in the direction indicated by arrow 41 in FIG. 9, the second rod 38 causes the control member 36 to turn in the direction indicated by arrow 42 (counterclockwise in FIGS. 12 to 14, and clockwise in FIGS. 15 to 17), thereby resulting in pulling the first rod 35 inwards (arrow 14) so as to cause the side plate 8 to pivot in the direction indicated by arrow 40, inwards (arrow 14) and backwards (arrow 13).

Naturally, the present invention is not limited to the above-described embodiments, and it is possible to make numerous changes and modifications to them without going beyond the field of the invention.

Naturally, it is possible to provide any independent control means (e.g. electrically driven means) under the central plate 7 for the purpose of causing the side plates 8 or the members 36 to pivot.

Naturally, it is also possible, in the embodiment shown in FIGS. 12 to 17, to provide a spring analogous to the spring 47 of FIG. 11 and continuously urging the side plate 8 in one direction or the other in order to facilitate pivoting thereof in the desired preferred direction.

Instead of using one member for each side plate 8, it is possible to use a single member 36 for actuating the two side plates 8, by providing a single rod 38 so as to cause said member 36 to pivot, and by providing for one of the side plates 8, e.g. the right side plate in FIGS. 15 to 17, a lug 39 in a position diametrically opposite from the position shown in said figures for the purpose of actuating the corresponding rod 35, advantageously in the same traction direction in order cause the side plate 8 to pivot towards its pivoted position. In which case, it can be useful to provide a spring (not shown) continuously urging each side plate 8 towards its normal position, in order to facilitate return to said normal position.

The invention claimed is:

1. A retractable back shelf system for a convertible vehicle having a foldable roof, a bodywork, and a rear trunk, said system comprising:
    a central plate having a top surface and an opposite bottom surface,
    side plates disposed on either side of the central plate and movable relative thereto between a retracted position in which each side plate is retracted substantially under the central plate and a laterally extended position in which each side plate extends outwards relative to said central plate, each side plate being provided with an extension which extends transversely inwards under the central plate and carries a pivot member adapted to engage a coaxial complementary pivot member fixed under the central plate and being mounted to pivot about an axis that is common to the respective pivot members and coaxial complementary pivot member, which axis is substantially perpendicular to the top surface of the central plate,
    pivoting means for causing the central plate to pivot about a transverse axis between an operative position in which said central plate is in a standard position and an inoperative position,
    and moving means for moving the side plates relative to the central plate between said retracted and laterally extended positions,
    wherein said pivoting means are adapted for causing the central plate to be entirely stowed inside the rear trunk in said inoperative position.

2. The back shelf system according to claim 1, wherein, when the central plate is in the operative position, each said side plate extends in its entirety under the level of the central plate and the top surface of each said side plate remains in a plane that is stationary relative to the pivot axis of said side plate when said side plates are pivoted between said retracted position and said laterally extended position.

3. The back shelf system according to claim 1, wherein the pivot member which is fixed to each said side plate and the complementary pivot member which is fixed under the central plate are arranged such as to constitute coaxial helical guide means adapted to moving each said side plate axially while each said side plate is pivoting.

4. The back shelf system according to claim 3, wherein each complementary pivot member fixed under the central plate and each pivot member fixed to a corresponding side plate are respectively provided one with a helical cam surface and the other with cam follower wheel means adapted to bear against said helical cam surface.

5. The back shelf system according to claim 1, wherein the central plate is carried on either side by respective pivot arms, each of which is hinged, at a first end to the bodywork of the vehicle, and, at a second end, under the bottom surface of the central plate, and said pivot arms are arranged such that the central plate pivots downwards and forwards to move from its operative position to its inoperative position.

6. The back shelf system according to claim 5, wherein each said side plate carries a wheel adapted to bear against a guide surface carried by the bodywork of the vehicle and to slide along said guide surface while the central plate is pivoting so as to cause the corresponding side plate to pivot relative to the central plate.

7. The back shelf system according to claim 5, wherein each said side plate is connected in hinged manner to a first end of a first rod having a second end connected in a hinged manner to a control member secured to the central plate, and wherein the system further comprises means for moving the control member while the central plate is pivoting so as to cause the side plate to pivot relative to the central plate.

8. The back shelf system according to claim 7, wherein the control member is mounted under the central plate so as to pivot about an axis that is substantially perpendicular to said central plate, and is connected in a hinged manner to a first end of a second rod having a second end hinged to one of said pivot arms.

9. The back shelf system according to claim 1, further comprising means for causing each said side plate to pivot relative to the central plate while said central plate is pivoting.

10. A convertible vehicle having a transverse axis and comprising:
    a foldable roof
    a bodywork,
    a rear trunk,
    a movable back shelf system comprising:
        a central plate having a top surface and an opposite bottom surface, and
        side plates disposed on either side of the central plate and movable relative thereto between a retracted position in which each side plate is retracted substantially under the central plate and a laterally extended position in which each side plate extends outwards relative to said central plate,
        each said side plate having a top surface, being provided with an extension which extends transversely inwards under the central plate and carries a pivot member adapted to engage a coaxial complementary pivot member fixed under the central plate, and being mounted to pivot about an axis that is common to the respective pivot members and coaxial complementary pivot member, which axis is substantially perpendicular to the top surface of the central plate, pivoting means for causing the central plate to pivot about a transverse axis between an operative position in which said central plate is in a standard position and an inoperative position, and moving means for moving the side plates relative to the central plate between said retracted and laterally extended positions, wherein said pivoting means are adapted for causing the central plate to be entirely stowed inside the rear trunk in said inoperative position.

11. The convertible vehicle according to claim 10, wherein the central plate is carried on either side by respective pivot arms, each of which is hinged, at a first end to said bodywork, and, at a second end, under the bottom surface of the central plate, and said pivot arms are arranged such that the central plate pivots downwards and forwards to move from its first position to its second position.

12. The convertible vehicle according to claim 10, wherein each said side plate carries a wheel adapted to bear against a guide surface carried by the bodywork and to slide along said guide surface while the central plate is pivoting so as to cause the corresponding side plate to pivot relative to the central plate.

13. The back shelf according to claim 1, wherein each side plate extends in its entirety under the level of the central plate in both the retracted position and the laterally extended position in which each side plate is in said standard position.

14. The convertible vehicle according to claim 10, wherein when the central plate is in the operative position, each side plate extends in its entirety under the level of the central plate and the top surface of each side plate remains in a plane that is stationary relative to the pivot axis of said side plate, when said side plates are pivoted between said retracted position and said laterally extended position.

15. The convertible vehicle according to claim 10, wherein each side plate extends in its entirety under the level of the central plate, in both the retracted position and the laterally extended position in which each side plate is in said standard position.

16. The back shelf system according to claim 1, wherein each side plate has a front inner corner and said extension is located close to said front inner corner.

17. The convertible vehicle according to claim 10, wherein each side plate has a front inner corner and said extension is located close to said front inner corner.

* * * * *